C. J. BRISTOL.
INSULATOR FOR BATTERY PLATES.
APPLICATION FILED SEPT. 27, 1909.

959,303.

Patented May 24, 1910.

Witnesses.
W. A. Loftus.
A. G. Hague.

Inventor.
C. J. Bristol
by Orvig & Lane Attys

UNITED STATES PATENT OFFICE.

CYRUS J. BRISTOL, OF DES MOINES, IOWA.

INSULATOR FOR BATTERY-PLATES.

959,303.

Specification of Letters Patent. Patented May 24, 1910.

Application filed September 27, 1909. Serial No. 519,729.

*To all whom it may concern:*

Be it known that I, CYRUS J. BRISTOL, a citizen of the United States, residing at Des Moines, in the county of Polk and State of Iowa, have invented a certain new and useful Insulator for Battery-Plates, of which the following is a specification.

The object of my invention is to provide a device of simple, durable, and inexpensive construction capable of being quickly and easily applied to the various plates of a secondary battery for the purpose of spacing said plates apart and insulating them electrically from each other.

A further object is to provide a device of this kind that will connect the plates together in such a manner that all of them may be quickly and easily bodily removed from the vessel in which the secondary battery is contained for convenience in handling and shipping.

My invention consists in the construction, arrangement, and combination of the various parts of the device whereby the objects contemplated are attained, as hereinafter more fully set forth, pointed out in my claims, and illustrated in the accompanying drawings, in which—

Figure 1:
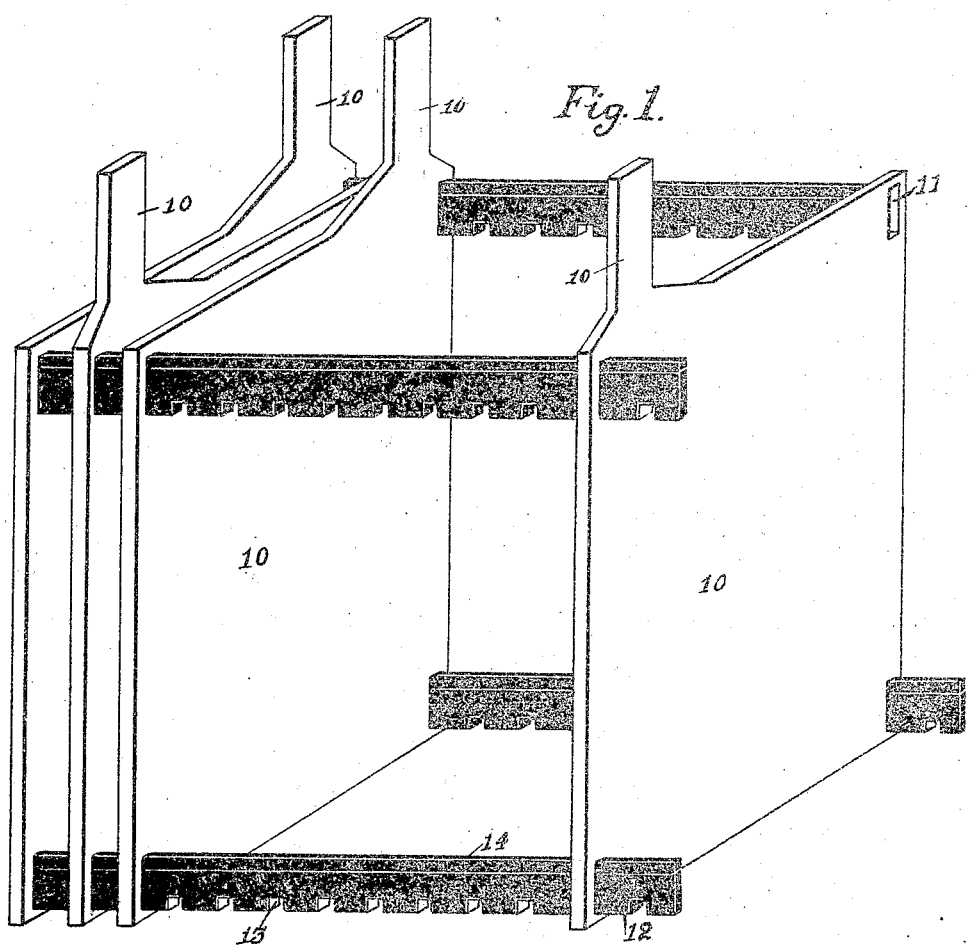
Figure 2:
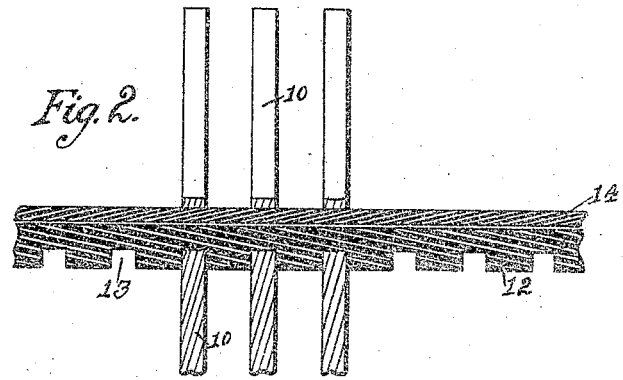

Figure 1 shows a perspective view of a number of battery plates connected by means of a device embodying my invention. Fig. 2 shows an enlarged, detail sectional view showing portions of a number of battery plates with my improved insulating device applied thereto.

Referring to the accompanying drawings, I have used the reference numeral 10 to indicate the battery plates. These plates are provided at their corners with oblong openings 11. These openings may be formed in the plates when the plates are manufactured and the number and size of the openings may be varied as desired.

In connecting the various plates of a battery, it is essential that the plates be slightly spaced apart and that the connecting devices be made of insulating material. To accomplish this purpose, I have provided the following devices: The reference numeral 12 indicates a bar made of an insulating material and provided with a number of notches 13 on its lower edge, said notches being of substantially the same width as the thickness of the battery plates. The vertical dimension of the bar 12, from its upper to its lower edge between the notches, is slightly less than the vertical dimension of the opening 11 so that said bar may freely slide longitudinally through the openings 11 of the battery plates, and after it has been placed through the openings, it may move downwardly with the battery plates resting in the notches 13. In order to lock the bars and plates in said position, I have provided a locking strip 14 of such size and shape as to be capable of entering the upper portions of the openings 11 and engaging the plates at the upper portions of the opening and also the top edge of the bar 12. The said bar 12 and locking strip 14 are preferably of a length slightly less than the interior dimension of the vessel in which the plates are to be placed and the ends thereof project beyond the end plates far enough to hold said plates spaced apart from the walls of the battery cell.

In practical operation and assuming that a number of battery plates are connected by means of my improved insulating device, the said plates may be handled as a unit without danger of having them come apart or become displaced relative to each other. In the event that it is desired to remove any one or more of said plates, it is only necessary to first withdraw all of the locking strips 14, then elevate the bars 12, and then move the bars 12 longitudinally through the openings 11, whereupon the plates are all disconnected from each other. Furthermore, so long as the plates are connected by means of my improved insulator, as shown in Fig. 1 of the drawings, they are all accurately spaced apart and firmly supported in position relative to each other, and on account of the bars and locking strips being made of insulating material, the battery plates are insulated from each other.

I claim as my invention:

1. The combination with battery plates, having openings therein, of a bar having notches at one edge, designed to be extended through said openings and to admit the adjacent portions of the battery plates in the notches thereof, and a locking strip designed to be extended through the openings in the battery plates to engage the edge of said bar opposite from the notches.

2. A device of the class described, comprising a series of battery plates having a number of oblong openings therein, bars extended through the openings in the plates, said bars being notched at their lower edges, said notches being designed to admit the adjacent portions of the battery plates therein, the parts of said bars between the notches being of such size as to freely pass through the openings in the plates, and a locking strip for each bar designed to pass through the openings in the battery plates when the said battery plates are resting in the notches of the bars and to engage the adjacent portions of the battery plates and also the top edges of said bars, for the purposes stated.

3. The combination with battery plates, having openings therein, of a bar having notches at one edge, designed to be extended through said openings and to admit the adjacent portions of the battery plates in the notches thereof, and a locking strip designed to be extended through the openings in the battery plates to engage the edge of said bar opposite from the notches.

Des Moines, Iowa, June 16, 1909.

CYRUS J. BRISTOL.

Witnesses:
NELLIE M. TAYLOR,
RALPH ORWIG.